(12) United States Patent
Robinson et al.

(10) Patent No.: US 11,293,844 B2
(45) Date of Patent: Apr. 5, 2022

(54) TISSUE PROCESSING APPARATUS FOR PROCESSING BIOLOGICAL TISSUE

(71) Applicant: SHANDON DIAGNOSTICS LIMITED, Runcorn (GB)

(72) Inventors: Daniel Peter Robinson, Runcorn (GB); Michael James Forshaw, Runcorn (GB); David John Chan, Runcorn (GB); Mark Baker, Runcorn (GB); David McNulty, Runcorn (GB); Marc Neill Murphy, Runcorn (GB)

(73) Assignee: SHANDON DIAGNOSTICS LIMITED, Runcorn (GB)

( * ) Notice: Subject to any disclaimer, the term of this patent is extended or adjusted under 35 U.S.C. 154(b) by 0 days.

(21) Appl. No.: 16/645,875

(22) PCT Filed: Jul. 12, 2018

(86) PCT No.: PCT/EP2018/069043
§ 371 (c)(1),
(2) Date: Mar. 10, 2020

(87) PCT Pub. No.: WO2019/048112
PCT Pub. Date: Mar. 14, 2019

(65) Prior Publication Data
US 2020/0264078 A1 Aug. 20, 2020

(30) Foreign Application Priority Data
Sep. 11, 2017 (GB) ...................................... 1714577

(51) Int. Cl.
*G01N 1/00* (2006.01)
*G01N 1/31* (2006.01)
(Continued)

(52) U.S. Cl.
CPC ................ *G01N 1/312* (2013.01); *B01L 9/52* (2013.01); *G01N 1/34* (2013.01); *G01N 1/36* (2013.01);
(Continued)

(58) Field of Classification Search
None
See application file for complete search history.

(56) References Cited

U.S. PATENT DOCUMENTS

| 4,838,999 A | 6/1989 | Haar et al. |
| 5,800,056 A | 9/1998 | Suzuki et al. |

(Continued)

FOREIGN PATENT DOCUMENTS

| EP | 2372369 A2 | 10/2011 |
| WO | 0168259 A1 | 9/2001 |

(Continued)

OTHER PUBLICATIONS

USPTO, Non-Final Office Action for U.S. Appl. No. 16/097,899, dated Dec. 22, 2020, 20 pages.
(Continued)

*Primary Examiner* — Jyoti Nagpaul
(74) *Attorney, Agent, or Firm* — NK Patent Law

(57) ABSTRACT

A tissue processing apparatus for processing biological tissue. The tissue processing apparatus includes: an extraction device configured to, when connected to a reagent receptacle, take reagent out from the reagent receptacle for use by the tissue processing apparatus; a tag reader configured to read information from a machine-readable tag.

17 Claims, 2 Drawing Sheets

(51) Int. Cl.
  *B01L 9/00* (2006.01)
  *G01N 1/34* (2006.01)
  *G01N 1/36* (2006.01)
  *G01N 35/00* (2006.01)
  *G01N 35/10* (2006.01)

(52) U.S. Cl.
  CPC . *G01N 35/00663* (2013.01); *G01N 35/00732* (2013.01); *G01N 35/1002* (2013.01); *G01N 2035/00673* (2013.01)

(56) References Cited

U.S. PATENT DOCUMENTS

| | | | |
|---|---|---|---|
| 7,875,245 B2* | 1/2011 | Favuzzi | G01N 35/00871 422/403 |
| 9,335,336 B2* | 5/2016 | Silbert | G01N 35/00732 |
| 2005/0250211 A1 | 11/2005 | Reinhardt et al. | |
| 2006/0178776 A1 | 8/2006 | Feingold et al. | |
| 2008/0072664 A1 | 3/2008 | Hansen et al. | |
| 2009/0017491 A1 | 1/2009 | Lemme et al. | |
| 2010/0112624 A1 | 5/2010 | Metzner et al. | |
| 2010/0247383 A1 | 9/2010 | Okubo et al. | |
| 2011/0184570 A1 | 7/2011 | Nakanishi et al. | |
| 2011/0223077 A1 | 9/2011 | Tanaka et al. | |
| 2011/0240535 A1 | 10/2011 | Pehrson et al. | |
| 2012/0025954 A1 | 2/2012 | Takayama et al. | |
| 2014/0004552 A1 | 1/2014 | Favuzzi et al. | |
| 2014/0296089 A1 | 10/2014 | Holmes et al. | |
| 2018/0290457 A1 | 10/2018 | Ge et al. | |

FOREIGN PATENT DOCUMENTS

| | | |
|---|---|---|
| WO | 2007062649 A1 | 6/2007 |
| WO | 2013036941 A2 | 3/2013 |
| WO | 2014001530 A1 | 1/2014 |

OTHER PUBLICATIONS

Feldman, Ada T. et al.: "Tissue Processing and Hematoxylin and Eosin Staining", Histopathology: Methods and Protocols, Methods in Molecular Biology, vol. 1180, pp. 31-43, Jun. 18, 2014.

ISA/EP, International Search Report and Written Opinion for related PCT Patent Application No. PCT/EP2017/058565, dated Jul. 3, 2017, 11 pages.

UKIPO; Search Report for related UK Patent Application No. 1607882.6, dated Jul. 28, 2016, 1 page.

UKIPO, Search Report for corresponding UK Patent Application No. 1714577.2, dated Feb. 16, 2018, 2 pages.

ISA/EP, International Search Report and Written Opinion for corresponding PCT Patent Application No. PCT/EP2018/069043, dated Dec. 11, 2018, 11 pages.

USPTO, Non-Final Office Action for U.S. Appl. No. 17/353,839, dated Sep. 21, 2021, 22 pages.

USPTO, Final Office Action for U.S. Appl. No. 16/097,899, dated Apr. 8, 2021, 16 pages.

\* cited by examiner

TISSUE PROCESSING APPARATUS FOR PROCESSING BIOLOGICAL TISSUE

CROSS REFERENCE TO RELATED APPLICATIONS

This application is a U.S. National Stage application of PCT Patent Application No. PCT/EP2018/069043 filed on Jul. 12, 2018, which claims priority to United Kingdom Patent Application No. 1714577.2 filed on Sep. 11, 2017, the entire content of all of which is incorporated by reference herein.

FIELD OF THE INVENTION

This invention relates to a tissue processing apparatus for processing biological tissue.

BACKGROUND

When biological tissue samples are collected, it is common to prepare the samples for analysis, e.g. for viewing under a microscope. One method of preparation is to process the tissue samples by treating the biological tissue using various fluids and then to embed each sample in an embedding medium, typically a block of paraffin wax. The various fluids used to treat the samples are typically referred to as reagents and may include: fixatives, alcohols and clearing agents (e.g. hydrocarbon solvents such as xylene).

Biological tissue samples are typically processed by a tissue processing apparatus, which may be an enclosed tissue processor for anatomical pathology. Prior to processing biological tissue in a tissue processing apparatus, the biological tissue is typically stored in a fixative such as Formaldehyde. Within a typical tissue processing apparatus, a biological tissue sample is first treated with alcohol, and then with a clearing agent (typically a hydrocarbon solvent, such as xylene). Finally, the tissue processing apparatus treats the biological tissue with paraffin wax (an embedding medium) so as to infiltrate and fill the biological tissue with the wax. It typically takes 14 hours for the tissue processing apparatus to complete this process.

Next, the biological tissue is embedded in a block of paraffin wax by a tissue embedding apparatus, which may be referred to as an "embedding centre", in which the biological tissue (now filled with wax) is placed in a mould then filled with paraffin wax, which is rapidly cooled to form a solidified block of paraffin wax of predetermined shape and size (determined by the mould) containing the biological tissue. The predetermined shape and size of the block is chosen so that the solidified block is of a suitable shape and size to be used in a microtome, where the biological tissue can be cut into very fine slices that are suitable for use under a microscope.

It is known that initially treating a biological tissue sample with pure alcohol can cause the biological tissue sample to be damaged. To reduce the likelihood of damaging biological tissue, tissue processing apparatuses are normally configured to treat biological tissue samples in stages. For the case of alcohol, the concentration of the alcohol used to treat the biological tissue is gradually increased, starting from a dilute form and progressing towards a less dilute (purer) form. The aim is to prevent any degradation of the biological tissue during the tissue processing procedure that might render the biological tissue unsuitable for use.

In earlier models of tissue processing apparatus such as the Pathcentre® Enclosed Tissue Processor, a rotary valve system was used which selected one reagent receptacle from a number of reagent receptacles. In such models, there would typically be 16 to 20 reagent receptacles stored in the tissue processing apparatus, each of which contained a different state and/or type of reagent. The rotary valve system was configured to select the reagent receptacles in the required order, so as to treat the biological tissue with increasing strengths of the correct reagent. However, these models of tissue processing apparatuses generally required a technician to expend significant time and effort to ensure that each reagent receptacle contained the correct concentration and/or type of reagent, prior to the contents of that reagent receptacle being used in the tissue processing apparatus.

A more recent tissue processing apparatus made by Thermo Fisher Scientific originally under the name "Shandon Excelsior", referred to herein as an "Excelsior" tissue processor uses so-called "in-process" reagent management. The Excelsior tissue processor has multiple different reagent containing reagent receptacles, some of which contain alcohol of varying strengths, and others of which contain xylene of varying purity. Unlike the Pathcentre® rotary valve system, the "in-process" reagent management performed by the Excelsior tissue processor only requires the input of reagent receptacles containing pure alcohol and pure xylene, with other concentrations of alcohol and purity of xylene being obtained and controlled through use of the apparatus itself, via reagent receptacles that are concealed in the back of the machine.

The Excelsior tissue processor also has a floating buoy mechanism that is used to obtain specific gravity measurements of alcohol used by the tissue processor. These specific gravity measurements are used to infer the concentration of reagent in other reagent receptacles so that a determination can be made on when a new reagent receptacle containing new reagent is required.

In general, to maintain a high quality result, reagents (also the embedding medium) need to be replaced periodically.

The present inventors have observed that users can make mistakes when replenishing reagents. Mistakes observed by the present inventors include a user, upon being instructed to connect an extraction device of the tissue processing to a reagent receptacle containing reagent of a specified type that has not previously been used in a tissue processing apparatus:

wrongly indicating to the tissue processing apparatus that a reagent receptacle containing new (previously unused) reagent has been connected to the extraction device when in fact an existing reagent receptacle containing previously used reagent (e.g. in the form of waste) remains connected to the tissue processing apparatus connecting the extraction device to a reagent receptacle containing a wrong type (and/or concentration) of reagent for that position in a processing cycle When these mistakes occur, the present inventors have observed that a next batch of tissue samples to be processed will, in general, not be processed correctly and damage of tissue samples can occur, which may lead to delays in processing the tissue samples, and may also lead to delays in making a diagnoses based on the processed tissue samples.

For tissue processors with "in-process" reagent management such as the Excelsior tissue processor, the present inventors have observed that a common error is failure to replace a reagent such that, on the next processing cycle, the waste reagent from previous processing cycles is taken back into the processor as clean (i.e. previously unused) reagent and is placed in a concealed receptacle, which can make the cause of poor tissue processing difficult to identify and remedy. Current tissue processors generally rely on trust and correct answers being provided by users in response to questions by a GUI of the tissue processor.

In summary, the present inventors have observed a problem with existing tissue processing apparatuses in that, when a user is prompted to connect an extraction device of the tissue processing apparatus to a reagent receptacle containing reagent of a specified type and state (e.g. 100% alcohol, 100% xylene), sometimes the user forgets to perform this action or accidentally connects the extraction device to a reagent receptacle containing reagent that has been used previously and/or does not match the specified state and/or type of reagent. If a reagent of a wrong state and/or type is used by the tissue processing apparatus, this can cause irreversible damage to the biological tissue. However, these problems may not become apparent until after the biological tissue has been processed by the apparatus (which as noted above can take 14 hours).

The present invention has been devised in light of the above considerations.

SUMMARY OF THE INVENTION

A first aspect of the invention may provide:
a tissue processing apparatus for processing biological tissue, wherein the tissue processing apparatus includes:
an extraction device configured to, when connected to a reagent receptacle, take reagent out from the reagent receptacle for use by the tissue processing apparatus;
a tag reader configured to read information from a machine-readable tag;
wherein the tissue processing apparatus is configured to:
provide an indication to a user to instruct the user to connect the extraction device to a reagent receptacle containing reagent that has not previously been used in a tissue processing apparatus; and
after the user has connected the extraction device to a reagent receptacle and/or has indicated that such a connection has been made, use the extraction device to take reagent out from the reagent receptacle for use by the tissue processing apparatus only if it has been determined, based on information read by the tag reader from a machine-readable tag attached to the reagent receptacle, that the reagent receptacle contains reagent that has not previously been used in a tissue processing apparatus.

In this way, in a scenario where a user accidentally connects an extraction device to a reagent receptacle containing previously used reagent or indicates that the instructed connection has been made (when it has not), the tissue processing apparatus can avoid using the extraction device to take previously used reagent out from the reagent receptacle for use by the tissue processing apparatus, thereby avoiding problems that can be caused by the tissue processing apparatus using a previously used reagent (as discussed above).

Here it is to be noted that in general, currently available tissue processing apparatuses do not manage reagents by confirming that an extraction device has been connected to a reagent receptacle containing previously unused reagent, prior to taking reagent out of the reagent receptacle. For example, the Excelsior tissue processor discussed in the background section above monitors alcohol degradation after each tissue processor run (this is a measurement that takes about 30 seconds in one of the concealed receptacles in the back of the machine). This knowledge is used to prompt the discard and rotation of all the reagents (because of how tissue carry over works we only need one measurement of use and can use it to trigger renewal of each reagent type). However, as discussed above, the present inventors have found that problems can result if a user fails to connect a reagent receptacle containing previously unused reagent and/or reagent that is not of a specified type, when prompted to do so by the tissue processing apparatus. The present invention helps the tissue processing apparatus to confirm that the tissue processing apparatus has been connected to a reagent receptacle containing previously unused reagent (preferably of a specified type), when prompted to do so by the tissue processing apparatus.

A skilled person would appreciate that an indication can be given to a user to instruct the user to connect the extraction device to a reagent receptacle containing reagent that has not previously been used in a tissue processing apparatus. Such an indication could, for example, take the form of showing a message on a display of the tissue processing apparatus, e.g., that reads "Load new Alcohol at position Ex1".

For the purposes of this disclosure, the terms "reagent that has not previously been used in a tissue processing apparatus", "previously unused reagent" and "new reagent" may be used interchangeably.

For avoidance of any doubt, previously used reagent may have been previously used in the tissue processing apparatus itself, or in another tissue processing apparatus, since previously used reagent may cause problems regardless of which tissue processing apparatus it has been previously used by.

Preferably, the tag reader is an RFID (radio-frequency identification) tag reader and the/each machine-readable tag is an RFID tag.

The RFID tag reader may be configured to read information from an RFID tag via electromagnetic radiation (typically radio waves having a frequency of between $10^5$ and $10^{10}$ Hz) transmitted to the RFID tag reader by the RFID tag.

The/each RFID tag may be an active RFID tag configured to be powered by an on board battery to allow the RFID tag to transmit radio waves to the RFID tag reader.

The/each RFID tag may be a passive RFID tag configured to be powered, at least in part, by electromagnetic radiation received from an external source to allow the RFID tag to transmit radio waves to the RFID tag reader. The external source may be the RFID tag reader (in which case the RFID tag reader may be referred to as an "active" RFID tag reader) or some other external source.

Passive RFID tags may be preferred to active RFID tags as passive RFID tags tend to be cheaper than active RFID tags, and also avoid battery life issues commonly associated with active RFID tags.

RFID tag readers and RFID tags are well known devices the working of which would be well understood by a person skilled in the art and do not need to be described in further detail herein.

The tag reader need not be an RFID tag reader and the/each machine-readable tag need not be an RFID tag in all embodiments.

For example, the tag reader may be a visible code reader and the/each machine-readable tag may be a visible code. The visible code may be a barcode or a 2D barcode (such as a QR code), for example.

The tissue processing apparatus may have a storage area for storing one or more reagent receptacles. The storage area preferably includes at least one predetermined location for locating a reagent receptacle containing reagent of a specified type. The/each predetermined location may be associated with a respective extraction device configured to extract reagent of the specified type from a reagent receptacle located in the predetermined location.

The storage area may be a cavity in the tissue processing apparatus. The cavity is probably closable by a door, e.g. to provide a cabinet for storing one or more reagent receptacles, e.g. as shown in FIG. 2.

The tissue processing apparatus may house the tag reader (which as discussed below may be a tag reader/writer) in a location (e.g. on a wall or the door facing the storage area) such that the tag reader can read information from (and optionally write information to) a machine-readable tag attached to a reagent receptacle located in an aforementioned predetermined location in the storage area. This could allow information to be read from (and optionally written to) a tag attached to a reagent receptacle located by a user in the predetermined location, without requiring further user input.

Alternatively, a user may be guided (e.g. by prompts on a display of the tissue processing apparatus) to present a tag attached to a reagent receptacle to the tag reader prior to or after connecting an extraction device to the reagent receptacle.

If the tissue processing apparatus has a separate tag writer (see below), the tissue processing apparatus may house the tag writer in a location (e.g. on a wall or on/in a door facing the storage area) such that the tag writer can write information to a machine-readable tag attached to a reagent receptacle located in an aforementioned predetermined location in the storage area.

In other embodiments, the tag reader could be a handheld device. This could be useful e.g. to make it easier for earlier tissue processing devices to be retrofitted to use the invention, but may be more cumbersome than examples given above that allow machine-readable tags to be read from a reagent receptacle located in an aforementioned predetermined location in the storage area.

The tissue processing apparatus may be part of a tissue processing system that also includes:
  at least one machine-readable tag configured to be attached to a reagent receptacle and to store information describing the content of the reagent receptacle or information that allows the content of the reagent receptacle to be determined.

Preferably, the/each machine-readable tag is configured to store information describing the content of the reagent receptacle, rather than merely information that allows the content of the reagent receptacle to be (indirectly) determined.

For example, the information describing the content of the reagent receptacle stored by the/each machine-readable tag may include information indicating whether or not the reagent stored by the reagent receptacle has previously been used in a tissue processing apparatus.

In some embodiments, the only information describing the content of the reagent receptacle stored by the/each machine-readable tag could be a simple (e.g. yes/no) indication of whether or not the reagent stored by the reagent receptacle has previously been used in a tissue processing apparatus. But preferably, the/each tag stores additional information describing the content of the reagent receptacle, e.g. as described below.

For example, the information describing the content of the reagent receptacle stored by the/each machine-readable tag may include information indicating a type of reagent stored in the reagent receptacle (the type may include, for example, alcohol, a clearing agent or a fixative).

For example, the information describing the content of the reagent receptacle stored by the/each machine-readable tag may include information describing a concentration of reagent contained in the reagent receptacle.

For example, the information describing the content of the reagent receptacle stored by the/each machine-readable tag may include information describing an expiry date of reagent contained in the reagent receptacle.

Note that information describing the type and/or concentration of reagent contained in the reagent receptacle may allow a determination to be made as to whether or not the reagent receptacle contains reagent that has not previously been used in a tissue processing apparatus, even if a simple (e.g. yes/no) indication of whether or not the reagent stored by the reagent receptacle is not stored by the/each tag.

Thus, the information describing the content of the reagent receptacle stored by the/each machine-readable tag may include any one or more of:
  information indicating whether or not the reagent stored by the reagent receptacle has previously been used in a tissue processing apparatus;
  information indicating a type of reagent stored in the reagent receptacle;
  information describing a concentration of reagent contained in the reagent receptacle;
  information describing an expiry date of reagent contained in the reagent receptacle.

The/each at least one machine-readable tag may be configured to store information that allows the content of the reagent receptacle to be determined, rather than storing information describing the content of the reagent receptacle.

For example, the information that allows the content of the reagent receptacle to be determined stored by the/each machine-readable tag may include a unique identifier configured to identify a reagent receptacle to which the machine-readable tag is attached, wherein information describing the content of the reagent receptacle to which the machine-readable tag is attached is associated with the unique identifier in a data storage apparatus. In this way, a determination can be made as to whether or not the reagent receptacle contains reagent that has previously been used in a tissue processing apparatus based on the unique identifier, by using the unique identifier to look up the information describing the content of the reagent receptacle in the data storage apparatus. The data storage apparatus may be local or remote to the tissue processing apparatus, although it may be desirable to avoid a remote data storage apparatus e.g. since pathology laboratories are typically restricted by rules that make it difficult to get information into/out from such laboratories.

For these reasons, it is thought by the present inventors to be simpler and cleaner for the/each machine-readable tag to be configured to store information describing the content of the reagent receptacle, rather than merely information that allows the content of the reagent receptacle to be determined. For similar reasons, it is also thought to be preferable for the machine-readable tags to be rewritable (see below) so that the machine-readable tags can store up to date information.

Preferably, the tissue processing apparatus is preferably configured to provide an indication to a user to instruct the user to connect the extraction device to a reagent receptacle containing reagent of a specified type, preferably of a specified type and concentration.

For example, the specified type may be alcohol, a clearing agent (e.g. a hydrocarbon solvent such as xylene) or a fixative.

The concentration of reagent (if specified) may be expressed as a percentage (by volume) of the reagent that is of a specified type of reagent (e.g. 100% alcohol). For avoidance of any doubt, the concentration of a reagent may be expressed as a state of dilution of a reagent.

Note that the concentration of reagent need not always be specified explicitly, e.g. since it may be specified implicitly. For example, an instruction to "Load new Alcohol at position Ex1" may be interpreted by a skilled person to require connection of pure (100%) alcohol at position "Ex1".

Preferably, the tissue processing apparatus is configured to, after the user has connected the extraction device to a reagent receptacle and/or has indicated that such a connection has been made, use the extraction device to take reagent out from the reagent receptacle for use by the tissue processing apparatus only if it has been determined, based on information read by the tag reader from a machine-readable tag attached to the reagent receptacle, that the reagent receptacle contains reagent that is of the specified type (or, where applicable, is of the specified type and concentration).

In this way, in a scenario where a user accidentally connects an extraction device to a reagent receptacle containing reagent that is not of the specified type (or is not of the specified type and concentration) or indicates that the instructed connection has been made (when it has not), the tissue processing apparatus can avoid using the extraction device to take reagent of the wrong type and/or concentration out from the reagent receptacle for use by the tissue processing apparatus, thereby avoiding problems that can be caused by the tissue processing apparatus using a reagent of the wrong type and/or concentration (as discussed above).

The present invention is particularly useful where the specified type is alcohol (or is alcohol of a specified concentration, e.g. 100% alcohol), since if the tissue processing apparatus uses alcohol that has previously been used in a tissue processing apparatus when that is not appropriate, or uses a reagent other than alcohol when that is not appropriate, or uses alcohol of the wrong concentration, then the tissue processing apparatus may need to be cleaned or reset, which may create significant delays.

The tissue processing apparatus may be configured to, after the user has connected the extraction device to a reagent receptacle and/or has indicated that such a connection has been made, use the extraction device to take reagent out from the reagent receptacle for use by the tissue processing apparatus only if it has been determined, based on information read by the tag reader from a machine-readable tag attached to the reagent receptacle, that an expiry date of reagent contained in the reagent receptacle has not elapsed.

Preferably, the at least one machine-readable tag is a rewritable machine-readable tag (more preferably a rewritable RFID tag) configured to be rewritten to store updated information describing the content of the reagent receptacle.

To this end, the tissue processing apparatus may include a tag writer configured to write information to a machine-readable tag. The tag writer may be the same device as the tag reader, in which case the tag reader may be referred to as a tag reader/writer configured to read information from and write information to a machine-readable tag. Alternatively, the tag writer may be separate from the tag reader, in which case the tag writer may be referred to as a "separate" tag writer.

In this way, the machine-readable tag can be rewritten, e.g. by the tag writer (which as noted above may be part of a tag reader/writer or may be a separate tag writer), to store updated information describing the content of the reagent receptacle, e.g. if the content changes whilst the reagent receptacle is connected to the extraction device. This is useful since it keeps such information stored locally (and, as noted above, information transfer from pathology laboratories is typically severely restricted).

For example, a tag writer (which as noted above may be part of a tag reader/writer or may be a separate tag writer) may be configured to, after the extraction device has taken reagent out from the reagent receptacle such that the reagent receptacle is empty, write information to the machine-readable tag to store:

updated information indicating that the reagent receptacle is empty.

In this way, the tissue processing apparatus would be able to determine, based on information read by the tag reader from the machine-readable tag attached to the reagent receptacle, that the reagent receptacle does not contain reagent and therefore the tissue processing apparatus would be able to determine that the reagent receptacle would be able to have reagent put back in the reagent receptacle (e.g. after that reagent has been used by the tissue processing apparatus).

As another example a tag writer (which as noted above may be part of a tag reader/writer or may be a separate tag writer) may be configured to, after the extraction device has taken reagent out from the reagent receptacle and then reagent used by the tissue processing apparatus has subsequently been put back in the reagent receptacle by the tissue processing apparatus, write information to the machine-readable tag to store:

updated information indicating that reagent contained in the reagent receptacle has previously been used in a tissue processing apparatus (this information could be provided in various forms, e.g. as an indication that the reagent receptacle contains waste).

In this way, the tissue processing apparatus would be able to determine, based on information read by the tag reader from the machine-readable tag attached to the reagent receptacle, that the reagent receptacle contains reagent that has previously been used in a tissue processing apparatus. Consequently, the tissue processing apparatus would be able to avoid taking out the previously used (e.g. waste) reagent from the reagent receptacle for use by the tissue processing apparatus.

Note that the reagent used by the tissue processing apparatus may be put back in the reagent receptacle by the extraction device (which may be configured to put used reagent back in a reagent receptacle, as well as being configured to take reagent out from the reagent receptacle). The used reagent put back in the reagent receptacle may be reagent that has resulted from using the reagent that was originally contained in the reagent receptacle.

For the avoidance of any doubt, writing information to a machine-readable tag may involve rewriting part or all of the contents of the tag.

The tissue processing apparatus may be configured to provide an indication to a user to instruct the user to check the reagent receptacle (e.g. to check the content is as instructed), if it is determined, based on information read by the tag reader from the tag attached to the reagent receptacle, that the reagent receptacle contains reagent that has previously been used in a tissue processing apparatus and/or that the reagent receptacle contains reagent that is not of a specified type and/or that the reagent receptacle contains reagent that is not of a specified concentration Preferably, the tissue processing apparatus is further configured to:

after the extraction device has taken reagent out from the reagent receptacle for use by the tissue processing apparatus, write information to the machine-readable tag to store updated information describing the content of the reagent receptacle.

For example, after the extraction device has taken reagent out from the reagent receptacle for use by the tissue processing apparatus (and optionally after reagent used by the tissue processing apparatus has been returned to the reagent receptacle), the tissue processing apparatus may write information to the machine-readable tag to store updated information indicating that the reagent stored by the reagent receptacle has previously been used in a tissue processing apparatus.

For example, after the extraction device has taken reagent out from the reagent receptacle for use by the tissue processing apparatus after reagent used by the tissue processing apparatus has been returned to the reagent receptacle, the tissue processing apparatus may write information to the machine-readable tag to store updated information describing an updated concentration of reagent contained in the reagent receptacle.

The extraction device may include an inlet tube. The extraction device may be configured to be connected to a reagent receptacle by inserting an inlet tube of the extraction device into the reagent receptacle. The inlet tube may be configured to be secured to a reagent receptacle by a cap attached to the inlet tube, e.g. as shown in FIG. 2. The extraction device may be configured to, when the inlet tube is inserted into the reagent receptacle, take out reagent out from the reagent receptacle for use by the tissue processing apparatus by drawing the reagent out from the reagent receptacle through the inlet tube.

The tissue processing apparatus may include and be configured to use numerous extraction devices as described above.

Accordingly, the tissue processing apparatus may include:

a plurality of extraction devices, wherein each extraction device is configured to, when connected to a (respective) reagent receptacle, take reagent out from the reagent receptacle for use by the tissue processing apparatus.

Similarly, the tissue processing apparatus may be part of a tissue processing system that also includes:

a plurality of machine-readable tags wherein each machine-readable tag is configured to be attached to a (respective) reagent receptacle and to store information describing the content of the reagent receptacle or information that allows the content of the reagent receptacle to be determined.

The tissue processing apparatus may be configured to, in relation to each of two or more (not necessarily all) of the plurality of extraction devices:

provide an indication to a user to instruct the user to connect the extraction device to a reagent receptacle containing reagent (e.g. of a specified type, or of a specified type and concentration) that has not previously been used in a tissue processing apparatus; and after the user has connected the extraction device to a (respective) reagent receptacle and/or has indicated that such a connection has been made, use the extraction device to take reagent out from the reagent receptacle for use by the tissue processing apparatus only if it has been determined, based on information read by the tag reader from a machine-readable tag attached to the reagent receptacle, that the reagent receptacle contains reagent that has not previously been used in a tissue processing apparatus.

The indications may instruct the user to connect different extraction devices to different types of reagents and/or different concentrations. The different types of reagent may include, for example, alcohol, a clearing agent (e.g. a hydrocarbon solvent such as xylene) and/or a fixative.

The tissue processing apparatus may be configured in relation to each of the plurality of extraction devices, reagent receptacles, tags, and/or indications in the same manner as for an aforementioned extraction device, reagent receptacle, tag and/or indication as described above, e.g. so as to ensure that each extraction device is connected to a reagent receptacle containing reagent that has not previously been used in a tissue processing apparatus and/or contains reagent of a specified type and/or concentration.

The tissue processing apparatus may include a plurality of tag readers, and optionally a plurality of separate tag writers. The/each tag reader (and if present, the/each tag writer) may be located or otherwise configured as described above.

For example, the tissue processing apparatus may house a plurality of tag readers, with each tag reader being housed in a location such that the tag reader can read information from (and optionally write information to) a machine-readable tag attached to a respective reagent receptacle located an aforementioned predetermined location in the storage area.

The tissue processing apparatus may include a tissue processing region for using one or more reagents (e.g. one or more reagents as described herein) to process a biological tissue sample, e.g. by treating the biological tissue sample with one or more of the reagents. Such techniques are well known in the art.

For example, the tissue processing region may be for processing a biological tissue sample by treating the biological tissue sample with one or more reagents and then with an embedding medium. The plurality of reagents used to process the biological tissue sample may include one or more (preferably a plurality of) dehydrants and one or more (preferably a plurality of) clearing agents. The one or more dehydrants may include a plurality of alcohol solutions having differing concentrations and/or pure alcohol. The one or more hydrocarbon solvents may include one or more xylene solutions and/or pure xylene. The embedding medium may be paraffin wax.

The tissue processing apparatus may include a control unit for controlling operation of the tissue processing apparatus. The control unit may be configured to carry out one or more of the above-described determination steps and/or provide one or more of the above-described indications to a user, e.g. via a display of the tissue processing apparatus.

The tissue processing apparatus may have a display, though this is not a requirement since indications to a user may be provided by means other than a display in the tissue processing apparatus, e.g. a mobile phone of the user. The display could be wirelessly connected to the tissue processing apparatus (e.g. it could be a remote PC).

An above-described indication to a user may be provided, for example, via a display of the tissue processing apparatus, via a mobile phone application and/or via a message sent to a mobile phone. Other modes of providing information to a user could easily be envisaged by a skilled person.

The tissue processing apparatus may be configured to work in accordance with other techniques to allow a state (e.g. concentration) and/or a type of reagent contained in the reagent receptacle to be determined, e.g. as described in co-pending PCT application PCT/EP2017/058565.

A second aspect of the invention may provide a method, performed by a tissue processing apparatus according to the first aspect of the invention, that includes:

the tissue processing apparatus providing an indication to a user to instruct the user to connect the extraction device (of the tissue processing apparatus) to a reagent receptacle containing reagent that has not previously been used in a tissue processing apparatus; and after the user has connected the extraction device to a reagent receptacle and/or has indicated that such a connection has been made, using the extraction device to take reagent out from the reagent receptacle for use by the tissue processing apparatus only if it has been determined, based on information read by the tag reader from a machine-readable tag attached to the reagent receptacle, that the reagent receptacle contains reagent that has not previously been used in a tissue processing apparatus.

The method may include any method step implementing or corresponding to any apparatus feature described in connection with the first aspect of the invention.

A third aspect of the invention may provide a computer-readable medium comprising instructions which, when executed by a computer, cause a tissue processing apparatus according to the first aspect of the invention to perform a method according to the second aspect of the invention.

A fourth aspect of the invention may provide a method of retrofitting a tissue processing apparatus to provide a tissue processing apparatus according to the first aspect of the invention.

The method of retrofitting a tissue processing apparatus may include:

connecting a tag reader to the tissue processing apparatus; and/or updating software of a control unit of the tissue processing apparatus;

such that a tissue processing apparatus according to the first aspect of the invention is obtained.

The invention also includes any combination of the aspects and preferred features described except where such a combination is clearly impermissible or expressly avoided.

DETAILED DESCRIPTION

In general terms, the following description sets out an example of a tissue processing apparatus in which uniquely identified RFID tags may be attached to each reagent receptacle (in this example these are bottles), with an RFID tag reader/writer being located within the tissue processing apparatus. In a simple form, each tag attached to a reagent receptacle may simply indicate whether or not the reagent stored by the reagent receptacle has previously been used in a tissue processing apparatus. The tags can also contain information indicating the type of reagent they contain. In this way, the system can not only prevent re-use of waste reagent, but it can also prevent the initial use of the wrong reagent as well. This helps to prevent poor tissue processing and delayed or lost diagnosis.

Figure 1:
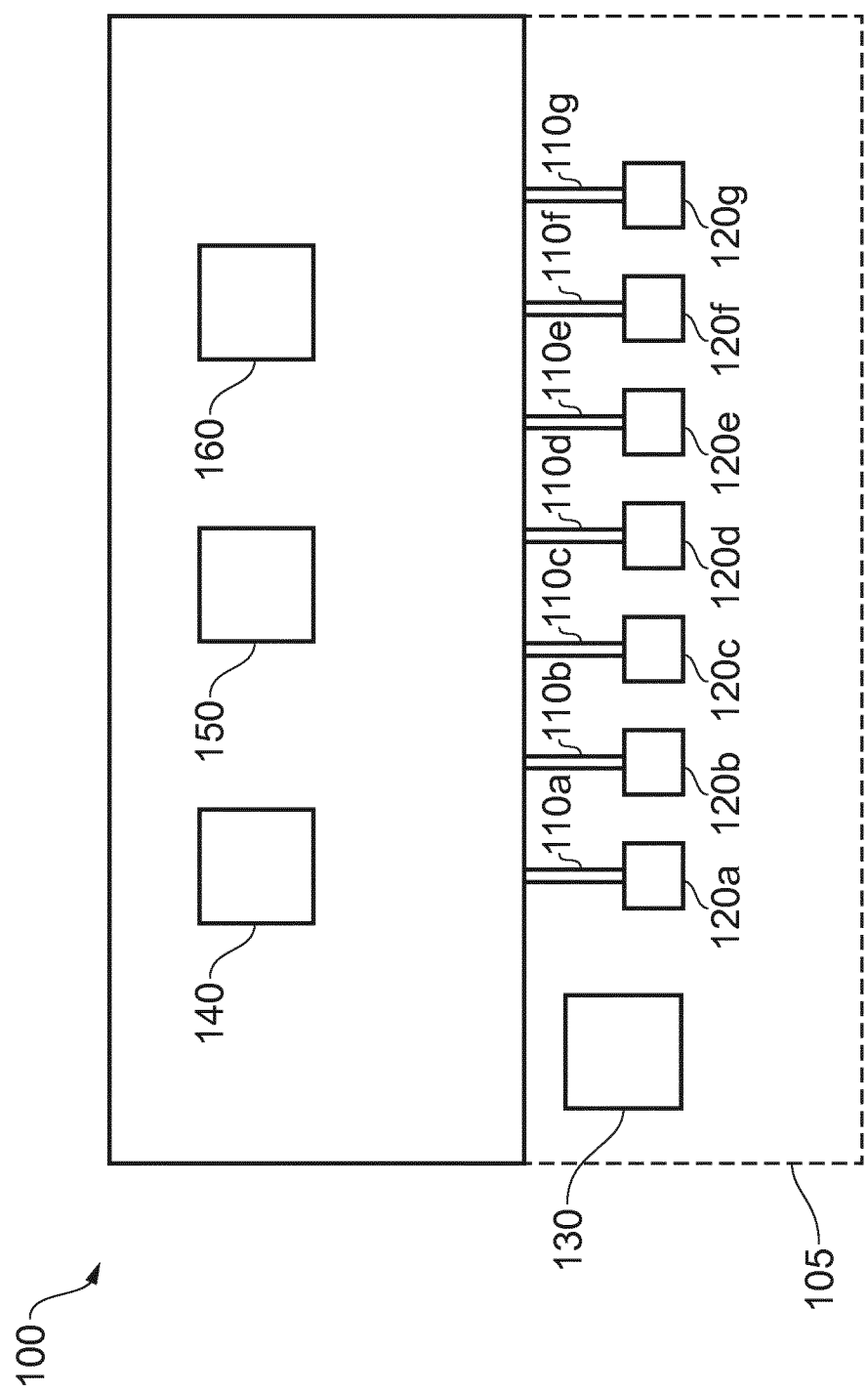
FIG. 1 is a schematic view of an example tissue processing apparatus.
Figure 2:
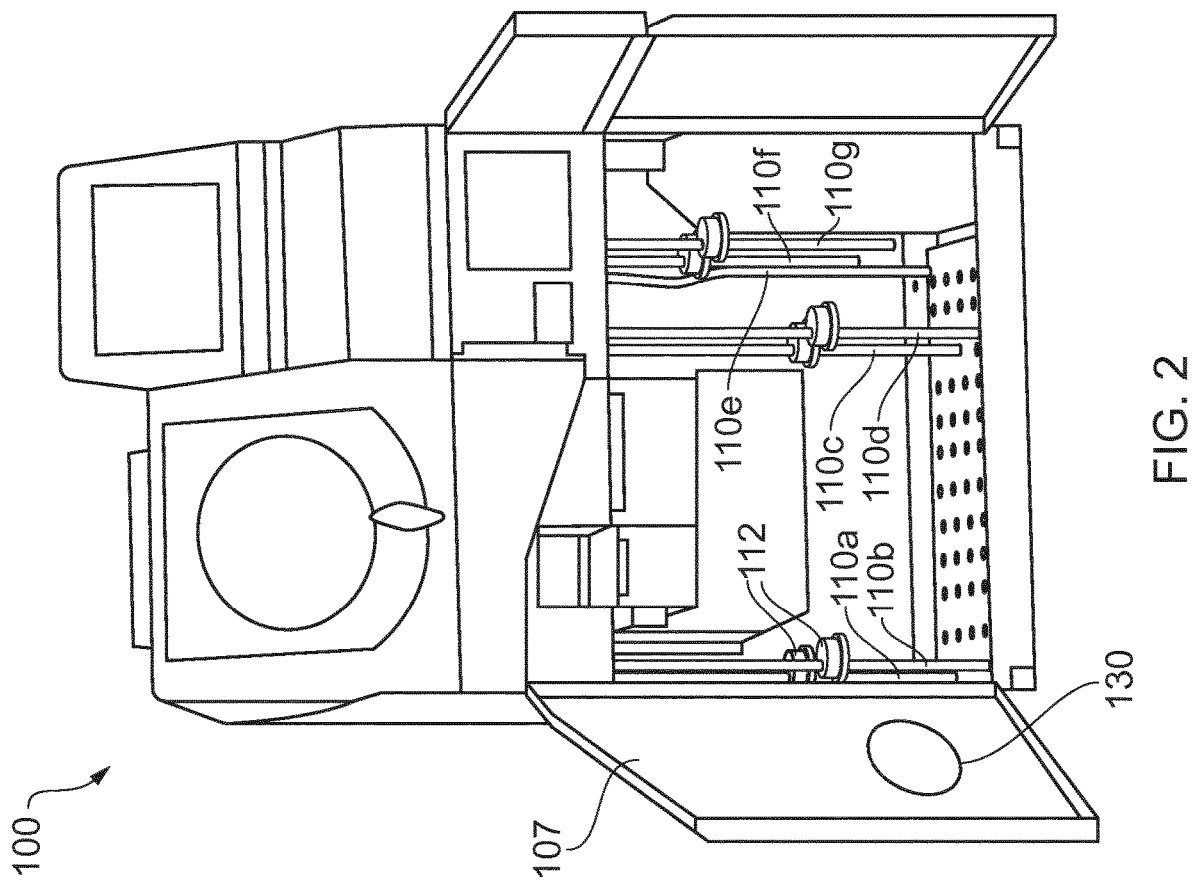
FIG. 2 is a perspective view of the tissue processing apparatus of FIG. 1.

FIG. 1 is a schematic view of an example tissue processing apparatus 100 according to the present invention, and FIG. 2 is a perspective view of the same tissue processing apparatus 100.

As shown in FIGS. 1 and 2, the tissue processing apparatus 100 includes a storage area 105 for storing a plurality of reagent receptacles 120a-g. In this example, the storage area 105 is a cavity in the tissue processing apparatus, closable by a door 107, to provide a cabinet for storing the plurality of reagent receptacles 120a-g.

The tissue processing apparatus 100 includes a plurality of extraction devices, wherein each extraction device is a respective inlet tube 110a-g and is configured to, when connected to a (respective) reagent receptacle, take reagent out from the reagent receptacle for use by the tissue processing apparatus 100. The inlet tubes 110a, 110b, 110c, 110d, 110f, 110g are provided with caps for vapour containment. In this example, the caps 112 are configured to rest on, rather than attach to, reagent receptacles, since reagent receptacles may vary in size/configuration. In other examples, the caps may be configured to attach to reagent receptacles, e.g. by means of a screw thread. The storage area 105 includes a plurality of predetermined locations for locating a reagent receptacle of a specified type, with each predetermined location being associated with a respective inlet tube 110a-g configured to extract reagent of the specified type from a reagent receptacle 120a-g located in the predetermined location.

In this particular example, there are seven inlet tubes 110a-g, wherein:

inlet tubes 110a, 110b is configured to extract fixative from reagent receptacles 120a, 120b inlet tube 110c is configured to extract a clearing agent, which in this case is a hydrocarbon solvent (xylene), from reagent receptacle 120c inlet tube 110d is configured to extract alcohol for tissue processing from reagent receptacle 120d inlet tube 110e is configured to extract a cleaning reagent (water) from reagent receptacle 120e (a cap 112 is not used for this inlet tube since water vapour does not pose a health risk)

inlet tube 110f is configured to extract a cleaning reagent (xylene) from reagent receptacle 120f inlet tube 110g is configured to extract a cleaning reagent (alcohol) from reagent receptacle 120g Typically, receptacle 120d containing alcohol needs to be replaced every 7-10 runs of the tissue processing machine, and receptacle 120c containing the clearing agent would typically be changed at the same frequency as receptacle 120d.

The most critical change concerns replacement of receptacle 120d containing alcohol, since connecting extraction device 110d to a receptacle containing previously used alcohol or the wrong type of reagent would mean that the tissue processing apparatus 100 would need to be cleaned or reset, creating potentially severe delays. The next most critical change concerns replacement of receptacle 120c containing clearing agent, since connecting extraction device 110c to a receptacle containing the previously used clearing agent or the wrong type of reagent could also be problematic. It is of course also preferable that when other reagents are to be replaced, that the other extraction devices are connected to reagent receptacles containing previously unused reagents of the required type.

The tissue processing apparatus 100 includes a control unit 140 (e.g. a computer), a display 150 and tissue processing region 160.

The control unit 140 is for controlling operation of the tissue processing apparatus 100.

The display 150 is for providing information to a user.

The tissue processing region 160 is for using one or more reagents, including the alcohol contained in reagent receptacle 120d and clearing agent contained in reagent receptacle 120c, to process a biological tissue sample.

In this example, the tissue processing apparatus also includes an RFID tag reader/writer 130 configured to read information from an RFID tag and to rewrite information to an RFID tag.

Figure 3:
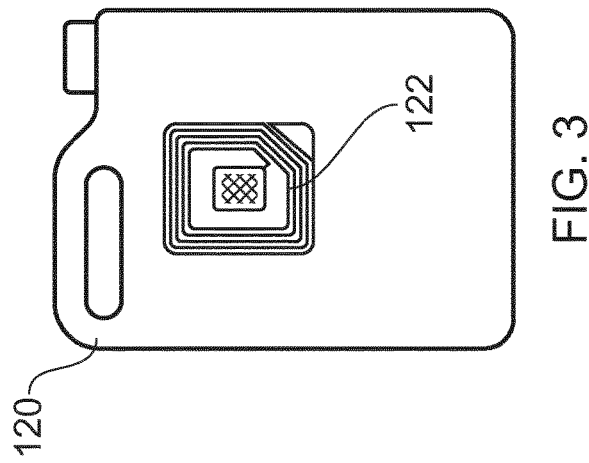
FIG. 3 is a front view of a reagent receptacle for use in the tissue processing apparatus of FIG. 1.

In this example, the RFID tag reader/writer 130 is housed in the door 107 of the storage area 105 in a location such that the RFID tag reader/writer 130 can read information from and write information to an RFID tag attached to the reagent receptacle 120d located in the predetermined location associated with inlet tube 110d. In this way, information can be read from and optionally written to the RFID attached to the reagent receptacle 120d, without requiring user input FIG. 3 shows an example RFID tag 122 attached to the reagent receptacle 120d. Note that the location of the RFID tag 122 on the reagent receptacle 120d and the location of the RFID tag reader/writer 130 are such that the RFID tag reader/writer 130 can read information from and write information to an RFID tag attached to the reagent receptacle 120d located in the predetermined location associated with inlet tube 110d.

In this example, the RFID tag 122 on the reagent receptacle 120d may store information that includes:
- information indicating whether or not the reagent stored by the reagent receptacle has previously been used in a tissue processing apparatus
- information indicating that the reagent stored by the reagent receptacle is alcohol
- optionally, the concentration of the alcohol stored by the reagent receptacle In this example, the tissue processing apparatus is configured to, in relation to extraction device 110d:
- provide an indication to a user to instruct the user to connect the extraction device 110d to a reagent receptacle containing alcohol (e.g. 100% alcohol) that has not previously been used in a tissue processing apparatus; and
- after the user has connected the extraction device 110d to a new reagent receptacle 120d and/or has indicated that such a connection has been made (e.g. in response to a GUI prompt on the display 150), use the extraction device 110d to take reagent out from the new reagent receptacle 120d for use by the tissue processing apparatus 100 only if it has been determined (e.g. by the control unit 140), based on information read by the RFID tag reader/writer 130 from the RFID tag 122 attached to the new reagent receptacle 120d, that the new reagent receptacle 120d contains alcohol that has not previously been used in a tissue processing apparatus.

The indication may be provided to a user by the display 150, e.g. by showing a message that reads "Load new Alcohol at position Ex1".

Note that the user simply needs to replace an existing reagent receptacle 120d having an RFID tag with a new reagent receptacle 120d having an RFID tag, as they would do with existing machines, without requiring an additional step of presenting the reagent receptacle to the RFID tag reader/writer 130, since as described above, the RFID tag reader/writer is located so that it can read information from and write information to an RFID tag attached to the reagent receptacle 120d located in the predetermined location associated with inlet tube 110d, without further user input.

The determination would typically be carried out by the control unit 140, though in other embodiments it could be carried out by a computer remote from the tissue processing apparatus.

The tissue processing apparatus may be configured to provide an indication to the user to instruct the user to check the reagent receptacle (e.g. to check the content is as instructed), if it is determined, based on information read by the RFID tag reader/writer 130 from the RFID tag 122 attached to the new reagent receptacle 120d, that the new reagent receptacle 120d contains reagent that has previously been used in a tissue processing apparatus or contains reagent that is not alcohol (or, if applicable, is not of a specified type).

After the reagent is taken into the tissue processing apparatus from the new reagent receptacle 120d, the RFID tag 122 may be re-written to indicate that the new reagent receptacle 120d is empty. After several processing runs the tissue processing apparatus 100 may unload the used reagent, e.g. after checking using the RFID tag reader/writer 130 that the reagent receptacle 120d is empty. Whilst or after the waste reagent is transferred into the empty receptacle 120d, the tag 122 may be re-written to indicate waste is present (which equates to an indication that the reagent stored by the reagent receptacle 120d has previously been used by a tissue processing apparatus 100). In this way, waste can be prevented from be being re-entered into and used by the tissue processing apparatus 100.

In this example, the tissue processing apparatus 100 is also configured to, in relation to extraction device 110c:
- provide an indication to a user to instruct the user to connect the extraction device 110c to a reagent receptacle containing a clearing agent (e.g. xylene) that has not previously been used in a tissue processing apparatus; and
- after the user has connected the extraction device 110c to a new reagent receptacle 120c and/or has indicated that such a connection has been made, use the extraction device 110c to take reagent out from the new reagent receptacle 120c for use by the tissue processing apparatus 100 only if it has been determined, based on information read by the RFID tag reader/writer 130 from an RFID tag attached to the new reagent receptacle 120c, that the new reagent receptacle 120c contains clearing agent that has not previously been used in a tissue processing apparatus.

In the illustrated example, the location of RFID tag reader/writer 130 does not permit the RFID tag reader/writer 130 to read information from and write information to an RFID tag attached to the reagent receptacle 120c located in the predetermined location associated with inlet tube 110c without further user input, so the user would in this example need to present the new reagent receptacle 120c to the RFID tag reader/writer 130, e.g. upon being prompted to do so. The indication instructing the user to connect the extraction device 110c to a reagent receptacle containing a clearing agent may be suitably worded to provide such a prompt.

In other (non-illustrated) examples, the RFID tag reader/writer 130 may be sensitive enough to read information from and write information to an RFID tag attached to the reagent receptacle 120c located in the predetermined location associated with inlet tube 110c.

In yet further (non-illustrated) examples, the tissue processing apparatus may include a further RFID tag reader/writer 130 located so that it can read information from and write information to an RFID tag attached to the reagent receptacle 120c located in the predetermined location associated with inlet tube 110c, without further user input.

In this example, the tissue processing apparatus 100 is not configured to monitor the content of other reagent receptacles, such as those containing fixatives, but the tissue processing apparatus 100 could be modified to achieve this Nonetheless, it is to be noted that the tissue processing apparatus 100 could be modified to manage stocks of multiple, most or indeed all reagents, e.g. to manage alcohol and xylene stocks. Similarly, batch and expiry data of reagents could be recorded by RFID tags attached to some/all of the reagent receptacles 120a-g, and managed by the tissue processing apparatus 100.

Although in this example, the RFID tag reader/writer 130 is housed by the door 107, in other (non-illustrated) examples, the RFID tag reader/writer 130 could be housed elsewhere, or could be provided as a handheld device, or a handheld RFID tag reader/writer could be provided alongside the RFID tag reader/writer 130.

An old tissue processing apparatus could be retrofitted to provide the above-described functionality, e.g. by modifying the tissue processor to include an RFID tag reader/writer 130 in the door or as a handheld unit, and to provide updated software to its control unit 140.

In the above described example, the reagent receptacles are bottles, though other types of receptacles could be used.

The RFID tags could be attached to reagent receptacles from any supplier, and could be attached to reagent receptacles by a supplier themselves. In the examples discussed above, the RFID tag reader/writer 130 is unable to ascertain from an RFID tag the quality or exact chemical nature of the content of the reagent receptacle, unless that information is provided by the tag itself. However, the tag system may work in conjunction with other techniques to allow the quality/content of the reagent receptacles, e.g. as described in co-pending PCT application PCT/EP2017/058565.

When used in this specification and claims, the terms "comprises" and "comprising", "including" and variations thereof mean that the specified features, steps or integers are included. The terms are not to be interpreted to exclude the possibility of other features, steps or integers being present.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

All references referred to above are hereby incorporated by reference.

The invention claimed is:

1. A tissue processing apparatus for processing biological tissue, wherein the tissue processing apparatus includes:
   an extraction device configured to, when connected to a reagent receptacle by a user, take reagent out from the reagent receptacle for use by the tissue processing apparatus;
   a tag reader configured to read information from a machine-readable tag;
   wherein the tissue processing apparatus:
      provides an indication to the user to instruct the user to connect the extraction device to a reagent receptacle containing reagent that has not previously been used in a tissue processing apparatus; and
      after the user has connected the extraction device to a reagent receptacle and/or has indicated that such a connection has been made, the tissue processing apparatus uses the extraction device to take reagent out from the reagent receptacle for use by the tissue processing apparatus only if it has been determined, based on information read by the tag reader from a machine-readable tag attached to the reagent receptacle, that the reagent receptacle contains reagent that has not previously been used in a tissue processing apparatus.

2. A tissue processing apparatus according to claim 1, wherein the tissue processing apparatus is configured to provide an indication to a user to instruct the user to connect the extraction device to a reagent receptacle containing reagent of a specified type, wherein the tissue processing apparatus is configured to, after the user has connected the extraction device to a reagent receptacle and/or has indicated that such a connection has been made, use the extraction device to take reagent out from the reagent receptacle for use by the tissue processing apparatus only if it has been determined, based on information read by the tag reader from a machine-readable tag attached to the reagent receptacle, that the reagent receptacle contains reagent that is of the specified type.

3. A tissue processing apparatus according to claim 2, wherein the specified type is alcohol.

4. A tissue processing apparatus according to claim 2, wherein the tissue processing apparatus is configured to provide an indication to a user to instruct the user to connect the extraction device to a reagent receptacle containing reagent of a specified type and concentration, wherein the tissue processing apparatus is configured to, after the user has connected the extraction device to a reagent receptacle and/or has indicated that such a connection has been made, use the extraction device to take reagent out from the reagent receptacle for use by the tissue processing apparatus only if it has been determined, based on information read by the tag reader from a machine-readable tag attached to the reagent receptacle, that the reagent receptacle contains reagent that is of the specified type and concentration.

5. A tissue processing apparatus according to claim 1, wherein the at least one machine-readable tag is a rewritable machine-readable tag configured to be rewritten to store updated information describing the content of the reagent receptacle, and wherein the tissue processing apparatus includes a tag writer configured to write information to a machine-readable tag, wherein the tag writer is configured to, after the extraction device has taken reagent out from the reagent receptacle and then reagent used by the tissue processing apparatus has subsequently been put back in the reagent receptacle by the tissue processing apparatus, write information to the machine-readable tag to store:

updated information indicating that reagent contained in the reagent receptacle has previously been used in a tissue processing apparatus.

6. A tissue processing apparatus according to claim 1, wherein the tag reader is an RFID tag reader and the/each machine-readable tag is an RFID tag.

7. A tissue processing apparatus according to claim 6, wherein the/each RFID tag is a passive RFID tag configured to be powered, at least in part, by electromagnetic radiation received from an external source to allow the RFID tag to transmit radio waves to the RFID tag reader.

8. A tissue processing apparatus according to claim 1, wherein the tissue processing apparatus has a storage area for storing one or more reagent receptacles, wherein the storage area includes at least one predetermined location for locating a reagent receptacle containing reagent of a specified type, wherein the/each predetermined location is associated with a respective extraction device configured to extract reagent of the specified type from a reagent receptacle located in the predetermined location.

9. A tissue processing apparatus according to claim 8, wherein the tissue processing apparatus houses the tag reader in a location such that the tag reader can read information from a machine-readable tag attached to a reagent receptacle located in an aforementioned predetermined location in the storage area.

10. A tissue processing apparatus according to claim 9, wherein the location in which the tag reader is housed is on or in a door facing the storage area.

11. A tissue processing apparatus according to claim 1, wherein the tissue processing apparatus is part of a tissue processing system that also includes:
at least one machine-readable tag configured to be attached to a reagent receptacle and to store information describing the content of the reagent receptacle or information that allows the content of the reagent receptacle to be determined.

12. A tissue processing apparatus according to claim 11, wherein the information describing the content of the reagent receptacle stored by the/each machine-readable tag includes any one or more of:
information indicating whether or not the reagent stored by the reagent receptacle has previously been used in a tissue processing apparatus;
information indicating a type of reagent stored in the reagent receptacle;
information describing a concentration of reagent contained in the reagent receptacle;
information describing an expiry date of reagent contained in the reagent receptacle.

13. A tissue processing apparatus according to claim 1, wherein the tissue processing apparatus includes dfa plurality of extraction devices, wherein each extraction device is configured to, when connected to a respective reagent receptacle, take reagent out from the reagent receptacle for use by the tissue processing apparatus, wherein the tissue processing apparatus is configured to, in relation to each of two or more of the plurality of extraction devices:
provide an indication to a user to instruct the user to connect the extraction device to a reagent receptacle containing reagent that has not previously been used in a tissue processing apparatus; and
after the user has connected the extraction device to a respective reagent receptacle and/or has indicated that such a connection has been made, use the extraction device to take reagent out from the reagent receptacle for use by the tissue processing apparatus only if it has been determined, based on information read by the tag reader from a machine-readable tag attached to the reagent receptacle, that the reagent receptacle contains reagent that has not previously been used in a tissue processing apparatus.

14. A method, performed by a tissue processing apparatus according to claim 1, that includes:
the tissue processing apparatus providing an indication to a user to instruct the user to connect the extraction device of the tissue processing apparatus to a reagent receptacle containing reagent that has not previously been used in a tissue processing apparatus; and
after the user has connected the extraction device to a reagent receptacle and/or has indicated that such a connection has been made, using the extraction device to take reagent out from the reagent receptacle for use by the tissue processing apparatus only if it has been determined, based on information read by the tag reader from a machine-readable tag attached to the reagent receptacle, that the reagent receptacle contains reagent that has not previously been used in a tissue processing apparatus.

15. A computer-readable medium comprising instructions which, when executed by a computer, cause a tissue processing apparatus according to claim 1, to perform a method that includes:
the tissue processing apparatus providing an indication to a user to instruct the user to connect the extraction device of the tissue processing apparatus to a reagent receptacle containing reagent that has not previously been used in a tissue processing apparatus; and
after the user has connected the extraction device to a reagent receptacle and/or has indicated that such a connection has been made, using the extraction device to take reagent out from the reagent receptacle for use by the tissue processing apparatus only if it has been determined, based on information read by the tag reader from a machine-readable tag attached to the reagent receptacle, that the reagent receptacle contains reagent that has not previously been used in a tissue processing apparatus.

16. A tissue processing apparatus according to claim 1, wherein the tissue processing apparatus is for treating a biological tissue sample with alcohol, then with a clearing agent, then with an embedding medium so as to infiltrate and fill the biological tissue with the embedding medium.

17. A tissue processing apparatus according to claim 1, wherein the extraction device comprises a tube.

* * * * *